United States Patent Office 2,759,214
Patented Aug. 21, 1956

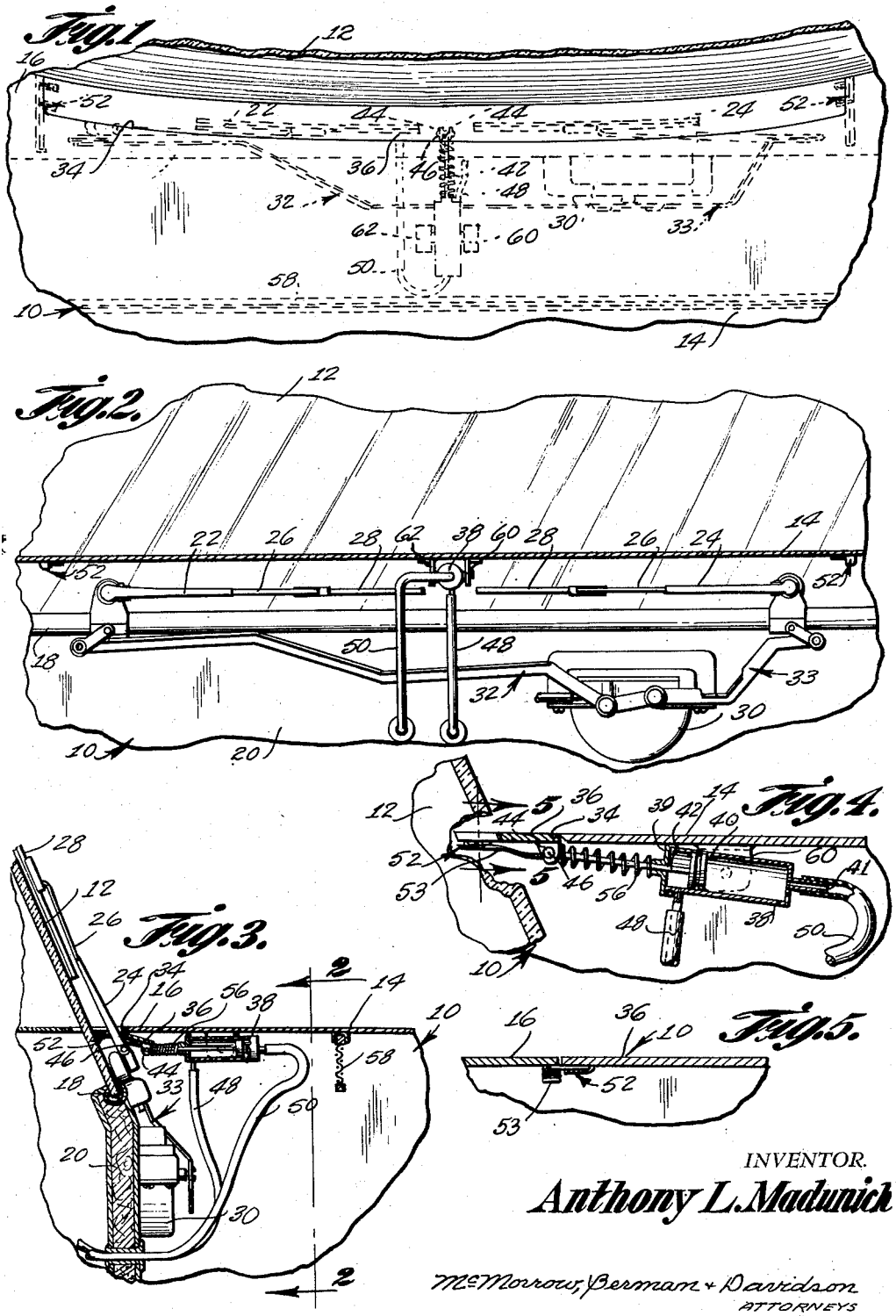

2,759,214
CONCEALED WINDSHIELD WIPER

Anthony L. Madunich, Thief River Falls, Minn.

Application April 13, 1954, Serial No. 422,802

3 Claims. (Cl. 15—255)

This invention relates to wipers for windshields of automotive vehicles and more particularly to a windshield wiper which is to be concealed when not in use.

It is a primary object of this invention to provide a windshield wiper for an automotive vehicle which will be concealed when not in actual use thereby eliminating interference with the vision of the vehicle operator due to reflection from the polished surfaces of the wiper blade arms and will prevent deterioration of the rubber or resilient portion of the wiper blade by preventing its exposure to the elements when not in use.

It is a further object of this invention to provide a windshield wiper blade which will be concealed when not in use and in which some of the noise would be eliminated when the windshield wiper is in operation due to the mounting of the moving parts of the wiper below the hood and not behind the instrument panel as presently constructed.

A further advantage in the concealed windshield wiper of this invention is the prevention of freezing to the glass of the wiper blade during freezing weather.

Yet another object and advantage of this invention will be the provision of a concealed windshield wiper device fabricated into one simple, detachable unit.

Other objects and advantages will become apparent from the following detailed description, forming the specification, and taken in conjunction with the accompanying drawing, wherein:

Figure 1 is a partial view of an automotive vehicle showing the windshield and hood portions thereof in top plan;

Figure 2 is a front elevational view of the windshield wiper embodying this invention as applied to an automotive vehicle, the portions of the vehicle illustrated in Figure 1 also being shown fragmentarily;

Figure 3 is a vertical cross sectional view through the hood, cowl and windshield portions of an automotive vehicle and through the vacuum cylinder of the windshield wiper showing the wiper blades in contact with the windshield;

Figure 4 is a vertical cross sectional view, on an enlarged scale, through the vacuum cylinder of the device and showing the blade in its concealed position and the retractable panel closing the opening in the cowl portion of the hood; and Figure 5 is a cross sectional view taken on line 5—5 of Figure 4.

With continued reference to the drawing, there is shown a portion of an automotive vehicle, generally indicated at 10, and showing specifically the windshield 12, a hood 14 and the rear or cowl portion 16 of the hood adjacent the windshield 12. The windshield 12 is carried along its lower edge in a channel 18 extending along the top of a firewall 20 which separates the motor compartment covered by the hood 14 from the interior of the cab portion. It will be noted that the lower edge of the windshield 12 is mounted below the hood 14 adjacent the cowl 16. The windshield is of the usual curved, one-piece construction commonly employed in the manufacture of automotive vehicles, although the invention may be applied to windshields of other designs and forms.

The windshield wiper of this invention comprises a pair of wiper blades 22 and 24 adapted to move in concert in oscillatory paths for wiping contact with the windshield 12. Each of the wiper blades includes the usual wiper blade arm 26 and the blade itself 28. The wiper blades 21 and 24 have their movement in oscillatory paths imparted thereto by a wiper blade motor 30 mounted on the firewall 20 and on the side of the firewall adjacent the motor. The motor 30 may be of the usual vacuum type, or an electrical type motor may be employed. The motor 30 is operatively connected to the wiper blades 22 and 24 through a mechanical linkage, generally indicated at 32 and 33 respectively to impart the oscillatory movement to the wipers 22 and 24 upon actuation of the motor 30.

The cowl 16 is provided with an elongated opening 34 of relatively narrow width adjacent the windshield 12 and is of sufficient length to permit the wipers 22 and 24 to extend therethrough when in operation and to permit the wipers to move in their arcuate paths without offering any obstruction to such movement.

A retractible panel 36 normally closes the opening 34. The panel is moved into and out of closing engagement with the opening 34 by means operatively connected to the panel. This means includes a pneumatically operated cylinder 38 carried on the undersurface of the hood 14 and having a piston movable therein longitudinally thereof. The piston head 40 of the piston has a piston rod 42 secured thereon and extends through the end of the cylinder 39 adjacent the panel 36. The end of the piston rod 42 remote from the piston head 40 extends between a pair of spaced parallel ears or lugs 44 dependingly carried by the panel 36 and is secured between these ears by a rivet or pin 46 which extends transversely through the ears 44 and the piston rod 42. A pair of hoses 48 and 50 extend from the cylinder 38 to a control button or knob, not shown, mounted on the instrument panel normally provided on the interior of the vehicle cab. One end of the hose 48 is connected to the cylinder 38 so as to communicate with the interior thereof adjacent the end of the cylinder through which the piston rod 42 extends while the other end of the hose 48 is operatively connected to the control knob on the instrument panel. Similarly, one end of the hose 50 is operatively connected into the control knob on the instrument panel while its other end is connected to the end of the cylinder 38 remote from the end 39 so as to be in communication with the interior of the cylinder forwardly of the piston head 40, or to the side thereof remote from the side from which the piston rod 42 extends.

The pneumatic cylinder 38 is operatively connected into the vacuum system of the internal combustion engine, not shown, of the vehicle and will be employed to cause operation of the piston within the cylinder when the control knob on the instrument panel to which the hoses 48 and 50 are connected is moved. When the knob on the instrument panel is moved, the vacuum generated by the vehicle engine or motor entering the cylinder 38 through an opening 41 will no longer draw air through the hose 50 since the knob on the instrument panel will be effective to shut off the hose 50 and hence, that portion of the cylinder forwardly of the piston head 40 will be evacuated and the piston will move toward the end of the cylinder remote from the end 39 carrying with it the piston rod 42, as the piston rod moves in a direction away from the windshield 12, the retractible panel 36 will move downwardly and in a direction away from the windshield 12, guided in its movement upon guides 52, one disposed adjacent opposite ends of the panel (Figure 1) so that it will be guided in its movement to uncover the opening 34 and be disposed beneath the cowl 16 adjacent the opening 34, as clearly shown in Figure 3. Each guide, generally indicated at 52, is of a flat resilient metal strap material which in effect is a leaf spring 53, and has its upper surface at one end thereof connected to the under surface of the cowl 16. It will be noted that the guide 52 extends downwardly and outwardly from its connection to the undersurface of the cowl 16 adjacent the windshield 12 so that the panel 36 will be suitably guided thereon to its retracted position uncovering the opening 34 to thus permit the subsequent operation of the wipers 22 and 24 therethrough.

A spiral compression spring 56 is encirclingly carried on the piston rod 42 and extends between the outer surface of the end 39 of the cylinder 38 and the adjacent surface of the ears or lugs 44. Therefore, as the piston is actuated so as to move in a direction away from the windshield and cause the panel 36 to be retracted, the spring 56 will be compressed, as shown in Figure 3.

With the panel 36 in its retracted position, the control knob, not shown, for operation of the windshield wiper motor 30 may then be moved so as to actuate the wipers 22 and 24 to clear the windshield of accumulated moisture which may be caused by rain or snow, etc.

It is contemplated that a single control knob may be mounted on the instrument panel for operation of both the retractible panel 36 and the motor 30 with the first operation being that of retracting the panel 36. Thus, the panel 36 may be selectively retracted to uncover the opening 34. Thereafter, if desired, the wipers 22 and 24 may be put into action by further movement of the control mounted on the instrument panel on the interior of the cab portion of the vehicle.

It will be apparent that with the panel 36 in its retracted position, there will be a flow of air passing therethrough and upwardly over the exterior surface of the windshield 12 which will assist in maintaining the windshield in a clean and serviceable condition by deflecting bugs or dirt and moisture thrown up by preceding vehicles traveling along wet pavements since this stream of air will pass continually over the outer surface of the windshield. In this latter connection, there may also be provided a screen 58 secured to the undersurface of the hood 14 and extending thereacross forwardly of the windshield 12 so as to screen the air passing therethrough and thence through the opening 34.

To again have the panel 36 return to its normal closing position with the opening 34, the control knob mounted on the instrument panel may be moved so as to release the vacuum in that part of the cylinder forwardly of the piston head 40, or to the side thereof remote from the side to which the piston rod 42 is connected. The compression of the spring 56 will then cause the panel to move upwardly and rearwardly along the guide 52 to again assume its normal closing position in the opening 34.

In connection with the operation of the vacuum operated cylinder 38, the operative connection to the vacuum system of the vehicle motor is shown in broken lines in Figure 1 and indicated at 60 and 62 respectively.

From the foregoing, it will be appreciated that there has been provided a windshield wiper for an automotive vehicle which may be concealed below the hood adjacent the cowl when not in use and in which there is provided a retractible panel which may be moved to a position below the cowl 16 of the hood 14, so as to uncover an opening 34 in the cowl adjacent the windshield 12 to permit subsequent operation of the wipers 22 and 24.

More specifically, there has been provided a windshield wiper for automotive vehicles having a hood and a cowl which has an opening extending therethrough on the hood, the wiper comprising at least one wiper blade mounted below the hood adjacent the cowl for movement in an oscillatory path for wiping contact with the windshield and extending through the opening in the cowl adjacent the windshield, a retractible panel normally closing said opening with said blade disposed therebelow, and means operatively connected to said panel for selectively retracting the panel to uncover the opening permitting the blade to pass therethrough and be moved in its arcuate path. Also, there has been provided a means for guiding the panel into and out of closing relation to the opening in the cowl.

While there is shown and described the preferred embodiment of the invention, it is to be understood that the structure is susceptible to change and modification within the practicability of the invention and therefore should be limited only by the scope of the claims appended hereto.

What is claimed is:

1. A windshield wiper for an automotive vehicle having a hood including a cowl portion having an opening therethrough, comprising a wiper blade mounted below the hood adjacent the cowl portion for oscillatory movement in an arcuate path for wiping contact with the windshield and extending through the opening in the cowl portion adjacent the windshield, a reciprocable panel normally closing said opening with said blade disposed therebelow, and means carried by the hood and operatively connected to said panel for selectively reciprocating the panel to uncover said opening permitting said blade to pass therethrough and be moved in its arcuate path.

2. A windshield wiper for an automotive vehicel having a hood including a cowl portion having an opening therethrough, comprising a wiper blade mounted below the hood adjacent the cowl portion for oscillatory movement in an arcuate path for wiping contact with the windshield and extending through the opening in the cowl portion adjacent the windshield, a reciprocable panel normally closing said opening with said blade disposed therebelow, and means operatively connected to said panel for selectively reciprocating the panel to uncover said opening permitting said blade to pass therethrough and be moved in its arcuate path, and leaf spring means secured on an undersurface portion of the cowl portion in engagement with the panel for guiding said panel into and out of closing relation with said opening.

3. A windshield wiper for an automotive vehicle having a hood including a cowl portion having an opening therethrough, comprising a wiper blade mounted below the hood adjacent the cowl portion for oscillatory movement in an arcuate path for wiping contact with the windshield and extending through the opening in the cowl portion adjacent the windshield, a reciprocable panel normally closing said opening with said blade disposed therebelow, and means operatively connected to said panel for selectively reciprocating the panel to uncover said opening permitting said blade to pass therethrough and be moved in its arcuate path, yielding means operatively connected between said first-mentioned means and said panel to urge said panel into closing relation with said opening, and leaf spring means secured on an undersurface portion of the cowl portion in engagement with the panel for guiding said panel into and out of closing relationship with said opening.

References Cited in the file of this patent

UNITED STATES PATENTS

| | | |
|---|---|---|
| 1,865,675 | Cavanaugh | July 5, 1932 |
| 2,106,403 | Carr | Jan. 25, 1938 |
| 2,206,822 | Rousseau | July 2, 1940 |
| 2,439,863 | Rappl | Apr. 20, 1948 |

FOREIGN PATENTS

| | | |
|---|---|---|
| 632,116 | Great Britain | Nov. 16, 1949 |